J. D. WILSON.
PROCESS OF PRESERVING CITRUS FRUIT.
APPLICATION FILED MAR. 14, 1917.
1,272,750.
Patented July 16, 1918.
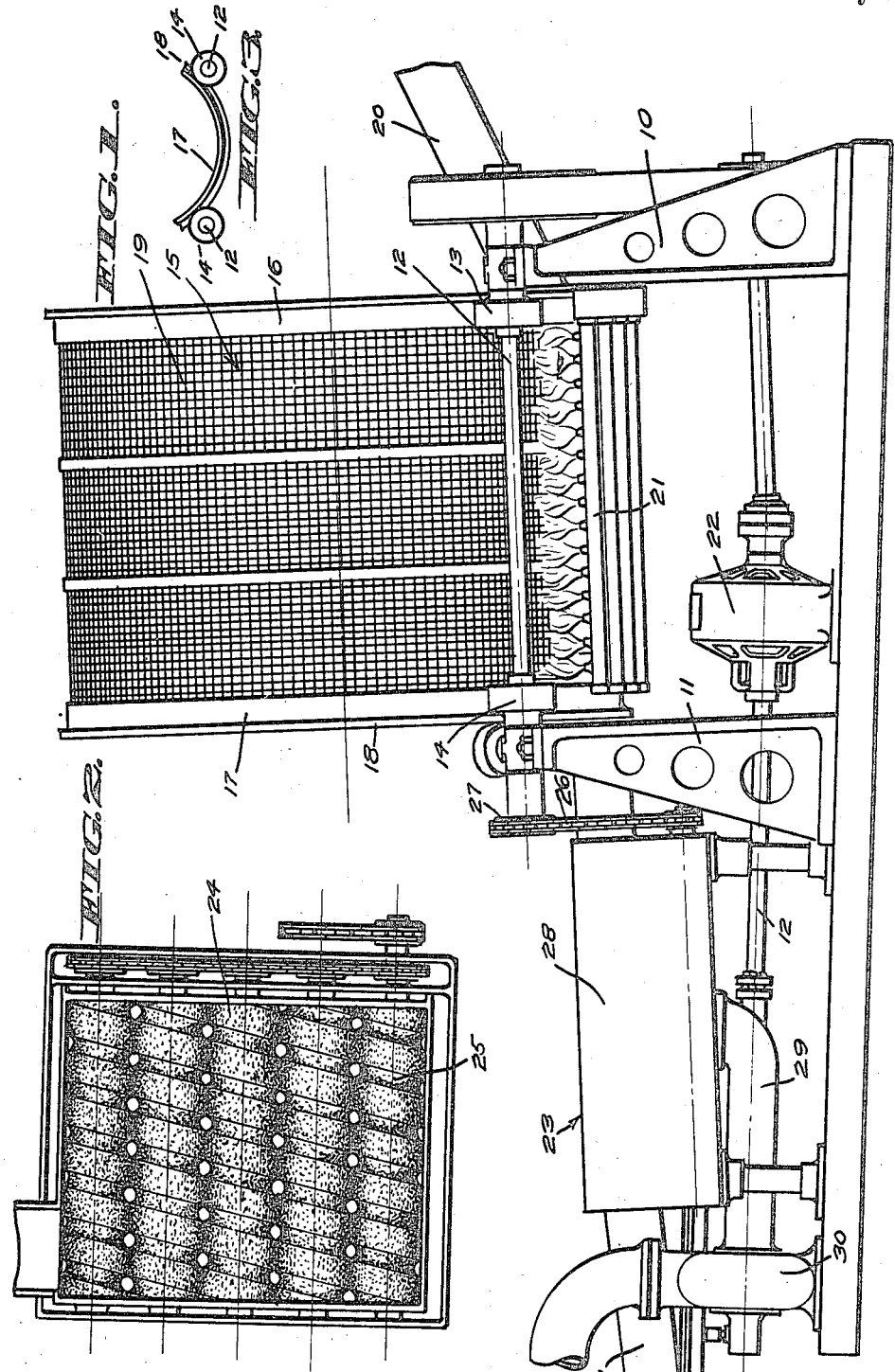
INVENTOR
JOSEPH D. WILSON
BY Hazard & Miller
ATTYS

UNITED STATES PATENT OFFICE.

JOSEPH D. WILSON, OF UPLAND, CALIFORNIA, ASSIGNOR OF ONE-HALF TO GEORGE A. HANSON, OF UPLAND, CALIFORNIA.

PROCESS OF PRESERVING CITRUS FRUIT.

1,272,750.

Specification of Letters Patent.

Patented July 16, 1918.

Application filed March 14, 1917. Serial No. 154,777.

*To all whom it may concern:*

Be it known that I, JOSEPH D. WILSON, a citizen of the United States, residing at Upland, in the county of San Bernardino and State of California, have invented new and useful Improvements in Processes of Preserving Citrus Fruits, of which the following is a specification.

This invention relates to a process of preserving fruits and vegetables.

It is the principal object of this invention to provide a process for destroying and removing spores and germs from the surface of fruit and vegetables which would cause deterioration, decay or rot, either in the peel or body of the objects being treated and which will render the surface of the objects immune from further attacks of damaging germs or spores.

Other objects will appear hereinafter.

The invention is illustrated, by way of example, in the accompanying drawings in which:

Figure 1 is a view in side elevation illustrating the preserving and sterilizing apparatus.

Fig. 2 is a view in plan illustrating the combined cleaning and conveying means along which the fruit passes after leaving the sterilizer.

Fig. 3 is a view in elevation illustrating the manner in which the drum is rotatably supported upon the driving rollers.

Referring more particularly to the drawings, 10 and 11 indicate standards adapted to rotatably support a pair of drive shafts 12 which are mounted in spaced relation to each other at the top of said standards. These drive shafts are parallel to each other and are inclined to the horizontal, as particularly disclosed in Fig. 1 of the drawings. Mounted at opposite ends of the shafts are friction rollers 13 and 14. These rollers are secured to rotate with the shafts and are fixed upon the shafts at points adjacent the uprights. Resting upon the rollers is a cylindrical drum 15. This drum is formed with a suitable frame work upon which are mounted circular end bands 16 and 17. These bands bear upon the faces of the rollers 13 and 14 and are held in place by means of flanges 18 which are formed integral with the bands and extend outwardly therefrom. Stretched over the frame work of the drum is a wall 19 composed of reticulated material. Fruit is adapted to be passed through the drum 15 and is delivered thereto from a chute 20. It will be seen that the drum is inclined and that a series of burners 21 is disposed beneath the drum and extend the length thereof. These burners are fitted with nozzles which extend upwardly and project flame through the mesh of the drum and around the fruit. The drum is rotated by the movement of the rollers 13 and 14, which in turn are driven by a motor 22 here shown as positioned beneath the structure and suitably connected with the shafts 12.

Disposed at the lower end of the drum is a cleaner 23 through which the fruit is adapted to pass after having been passed through the flame of the burners. This cleaner comprises a series of rotary brushes 24 which are formed with spiral grooves 25 extending throughout their length. These brushes are parallel to each other and are driven by a chain 26 connecting with a sprocket 27 which is secured to one of the drum shafts 12. The grooves in the brushes are arranged as shown in Fig. 2 so that they will co-act to rotate the fruit as it is passed through the cleaner. These rotary brushes are inclosed within a casing 28, the bottom of which is in communication with a pipe 29 leading to a suction pump or fan 30. As here shown, this pump is driven by the motor 22 and will act to draw away all of the foreign substance brushed from the fruit within the cleaner. After the fruit has passed along the brushes 24 it will pass out along a chute 31 to the packer.

In carrying out this process of sterilization, the fruit or vegetables to be treated are fed into the chute 20 from which they will pass into the sterilizing drum 15. This drum is continuously rotated by the rollers upon which it is supported and will therefore cause the fruit to roll in all directions as it passes along the bottom of the drum. During the course of travel of the fruit along the drum it is constantly passing through the flame from the burners 21. This flame impinges against the surface of the fruit and acts to sear and destroy all foreign matter thereupon, such as damaging germs or spores. The fruit thus treated will then pass to the cleaner 23 and along the brushes therein. As the brushes act upon the surface of the fruit the suction pump 30 will draw away the foreign material and will insure that the fruit will be free from all objectionable matter when it passes from the cleaner. This action not only renders the fruit clean, but has a tendency to prevent the accumulation of other spores or germs upon the surface of the peel and thereby sterilizes and preserves the fruit. It might be found preferable in some cases to pass a gas through the burner nozzles and on to the fruit without igniting it, in which case the chemical action of the gas will kill the germs and spores and obtain the same desirable result. In the treatment of citrus fruits, however, the flame has been found a satisfactory expedient. It may also be desirable to use electrodes in place of the burners here shown and described and thereby heat a gaseous fluid which is caused to pass over the surface of the fruit to be treated in order to render it sterile.

It will thus be seen that the process of preserving fruit here disclosed and the apparatus provided for attaining the results described afford means for readily treating large quantities of fruit by an effective sterilizing agent.

While I have shown the preferred construction of my apparatus, to be used in my process of preserving fruit and vegetables, as now known to me, it will be understood that various changes in the combination, construction and arrangement of parts may be made by those skilled in the art without departing from the spirit of my invention.

I claim:

A process of preserving fruits and vegetables, consisting in first passing the fruit or vegetables through a gaseous fluid of sufficient temperature to render the surface of the objects sterile and thereafter burnishing the objects until their surface is free from all foreign substances.

In testimony whereof I have signed my name to this specification.

JOSEPH D. WILSON.